United States Patent [19]

Riley

[11] Patent Number: 4,944,381
[45] Date of Patent: Jul. 31, 1990

[54] MULTI-DIRECTIONAL VIBRATORY CONVEYOR

[75] Inventor: Terry M. Riley, Santa Cruz, Calif.

[73] Assignee: FMC Corporation, Chicago, Ill.

[21] Appl. No.: 402,939

[22] Filed: Sep. 5, 1989

[51] Int. Cl.⁵ .............................................. B65G 47/46
[52] U.S. Cl. .................................. 198/370; 198/371; 198/753; 198/755; 198/771
[58] Field of Search .............. 198/753, 755, 761, 771, 198/370, 371

[56] References Cited

U.S. PATENT DOCUMENTS

| | | | |
|---|---|---|---|
| 3,068,996 | 12/1962 | Musschoot | 198/753 |
| 3,174,613 | 3/1965 | Insolio | 198/370 |
| 3,592,325 | 7/1971 | Sullivan et al. | 198/371 |
| 3,667,590 | 6/1972 | Mead | 198/753 |
| 3,712,459 | 1/1973 | Musschoot et al. | 198/753 |
| 3,835,983 | 9/1974 | Horii | 198/755 |
| 3,917,050 | 11/1975 | Gregor | 198/753 |

Primary Examiner—Joseph E. Valenza
Attorney, Agent, or Firm—A. J. Moore; R. C. Kamp; R. B. Megley

[57] ABSTRACT

A multi-directional vibratory conveyor is disclosed which includes a vibratory base plate which supports a plurality of fingers that project through holes in an alignment grill and in an adjustable grill. An article supported on the fingers is moved rectilinearly in a multiplicity of directions by moving the alignment grill rectilinearly, and is moved along a curved path by rotating the alignment grill a small amount.

22 Claims, 3 Drawing Sheets

U.S. Patent  Jul. 31, 1990  Sheet 1 of 3  4,944,381
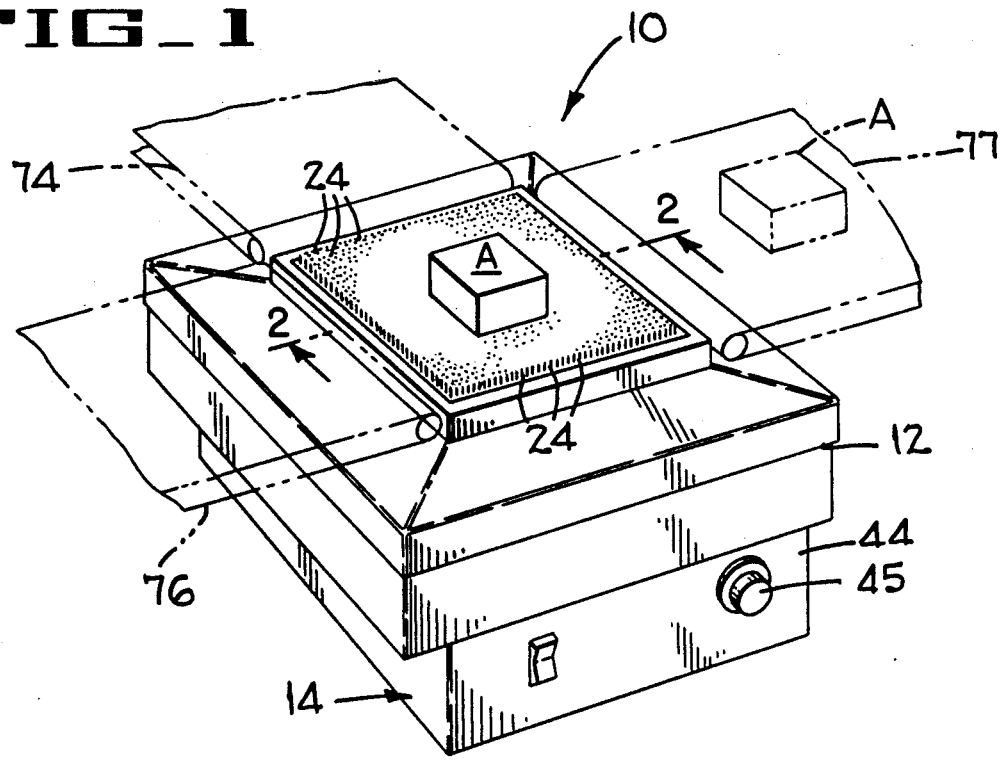
FIG_1
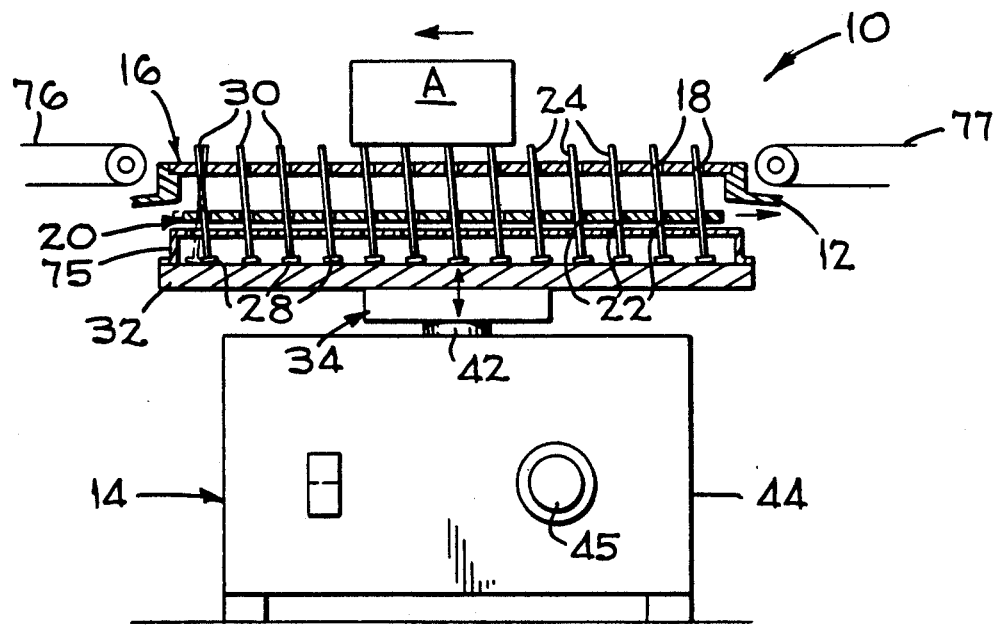
FIG_2

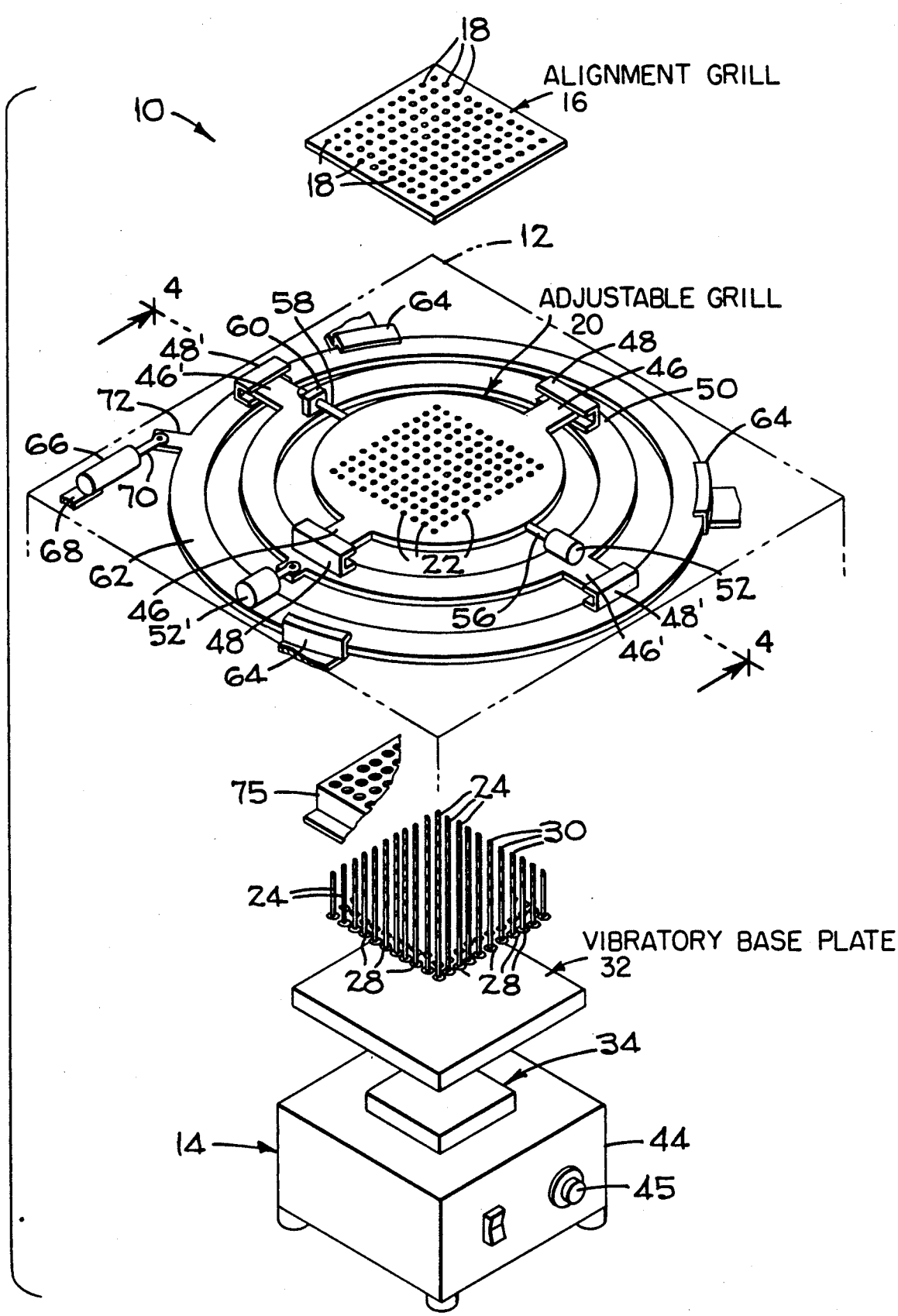

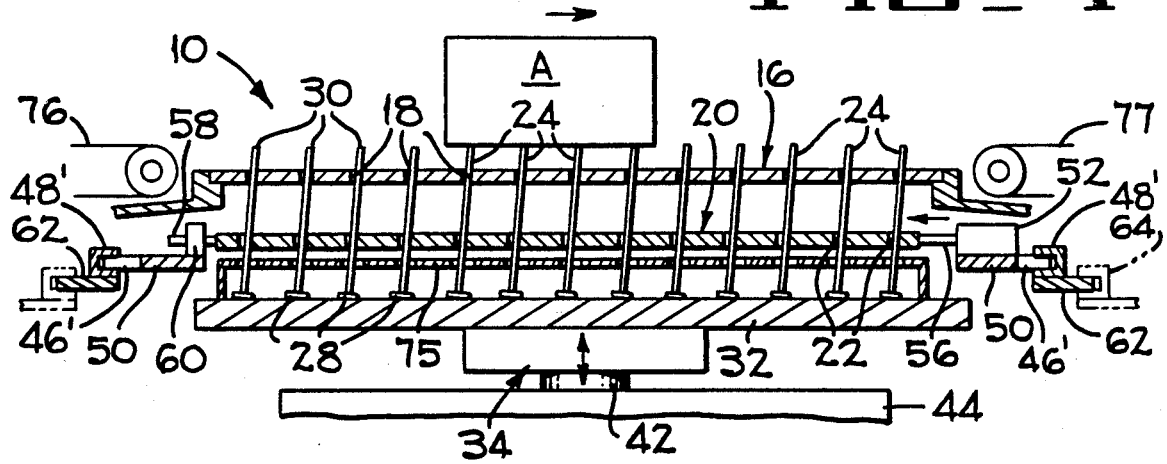
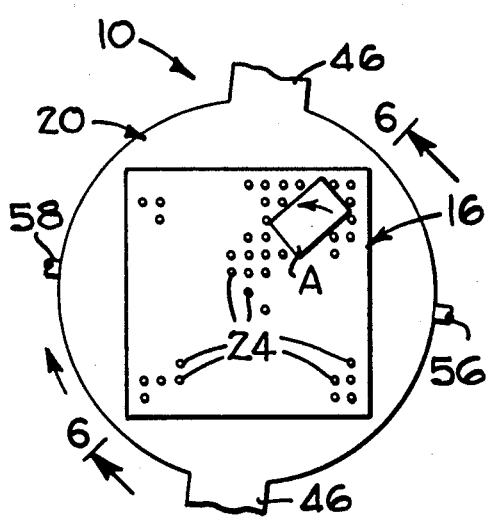
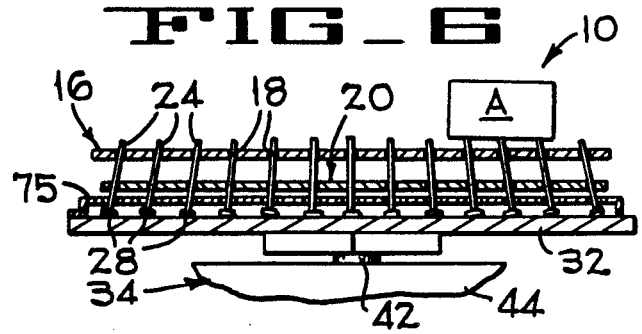
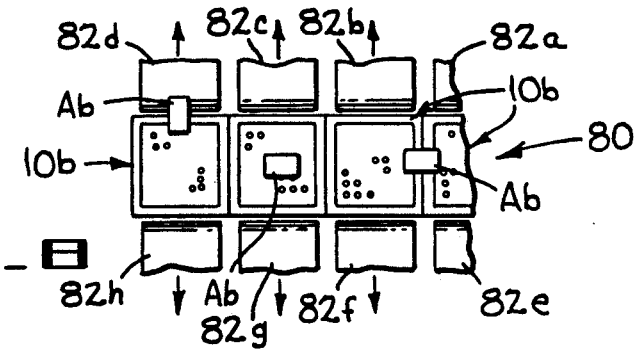
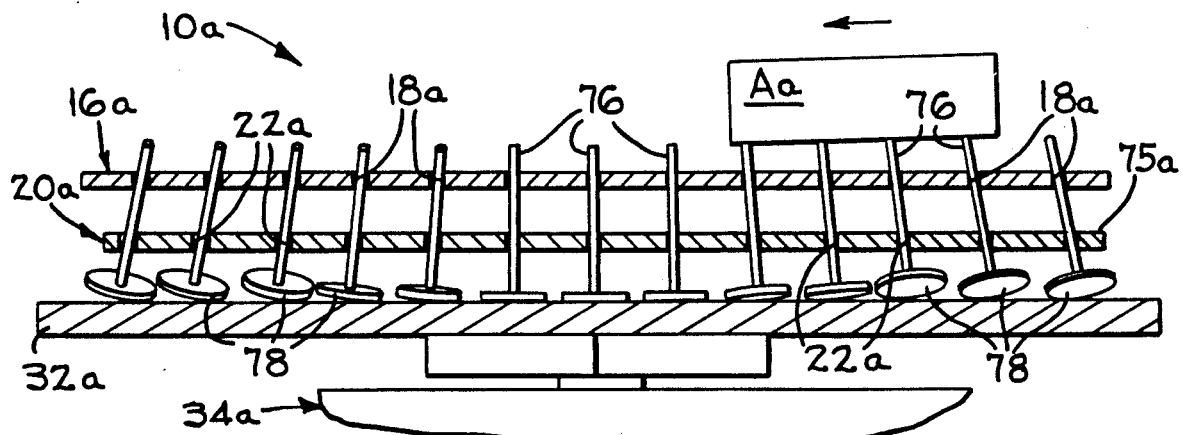

MULTI-DIRECTIONAL VIBRATORY CONVEYOR

BACKGROUND OF THE INVENTION

1. Field of the Invention

The present invention relates to a vibratory conveyor that includes a plurality of vibratory fingers which project through holes in upper and lower grills for supporting an article. The article may be moved in any selected horizontal direction, and the speed and direction of movement of the article can be changed by varying the inclination of the fingers and the frequency or amplitude of vibration of the fingers.

SUMMARY OF THE INVENTION

The multi-directional vibratory conveyor of the present invention is capable of translating and/or rotating an article in any substantially horizontal direction. The vibrator conveyor may handle any size or weight of articles, which preferably have substantially flat bottoms by using vibrating fingers of appropriate sizes to support the article, or batches of articles, of different weights. The direction of movement of the articles is controlled by the finger angle, and the rate of movement of the article is controlled by the frequency, the amplitude of vibration, and the degree of pin inclination.

DESCRIPTION OF THE DRAWINGS

FIG. 1 is a perspective illustrating the multi-directional vibratory conveyor of the present invention, the vibratory conveyor being disposed between a feed conveyor and two take-away conveyors shown in phantom.

FIG. 2 is an elevation showing the vibratory conveyor in section and adjusted to move an object to the left, said section being taken along lines 2—2 of FIG. 1.

FIG. 3 is an exploded diagrammatic perspective illustrating several components of the vibratory conveyor.

FIG. 4 is an enlarged section similar to FIG. 2 taken along lines 4—4 of FIG. 3 but illustrating the article supporting fingers angled in the opposite direction for moving the article to the right.

FIG. 5 is a diagrammatic plan illustrating a top alignment grill and an article being moved along a curved path by the fingers.

FIG. 6 is a section taken along lines 6—6 of FIG. 5 illustrating the top of the outer fingers inclined inwardly toward the center of the alignment grill due to rotation of the finger adjustment grill with the upper surface being a convex surface.

FIG. 7 is an enlarged section of a second embodiment of the invention that is similar to FIG. 6 but having fingers with large heads which cause the articles supported thereon to move toward the center of the grills in response to the grill being rotated a small amount.

FIG. 8 is a plan of an elongated conveyor assembly made up of a plurality of multi-directional vibratory conveyor assemblies for rotating the articles for inspection or the like and either discharging or receiving the articles from transversely oriented conveyors.

DESCRIPTION OF THE PREFERRED EMBODIMENT

The multi-directional vibratory conveyor 10 (FIG. 1) of the first embodiment of the present invention in general comprises a housing 12 (shown only in FIGS. 1-3) which includes a base 14. An alignment grill 16 having a plurality of holes 18 therein is connected to the upper end of the housing 12 by connectors such as bolts (not shown). An adjustable grill 20 having a plurality of holes 22 therein is movably supported within the housing 12. Each pair of holes 18,22 loosely receive one of a plurality of elongated fingers 24, which fingers of the first embodiment have relatively small heads 28 and preferably flat upper ends 30 which fingers are supported on a vibratory base plate 32 of a vibrating plate assembly 34.

Each finger 24 is loosely received in its associated hole 18,22 with the heads 28 resting upon the vibratory base plate 32 of the vibratory base plate assembly 34. The vibratory base plate is supported on a vertical shaft 42 (FIGS. 2 and 4) of a vibrator 44 which as illustrated may be of a type manufactured by FMC Corporation identified as Model J-50 - Flat Deck Jogger which is electromagnetically operated when handling small articles, and reciprocates both the shaft 42 and base plate 32 vertically. The vibrator 44 includes conventional controls 45 (FIG. 1) for varying the frequency and amplitude of vibration for different articles A. Although an electromagnetic vibratory has been referred to, it will be understood that electromechanical, pneumatic, hydraulic or other types of vibrators may be used.

As previously stated, the alignment grill 16 is rigidly secured to the upper end of the housing 12. The adjustable grill 20, however, is supported for rectilinear movement and arcuate movement on the housing 12 as illustrated in FIGS. 3 and 4.

The adjustable grill 20 (FIGS. 3 and 4) includes a pair of ears 46 movably received in diametrically opposed ear guiding channels 48 that are rigidly secured to an inner ring 50. A power unit 52 such as a hydraulic cylinder is secured to the inner ring 50 and has its piston rod 56 secured to the adjustable grill 20 for slidably moving the adjustable grill parallel to the channels 48. A guide pin 58 is secured to the adjustable grill 20 at a point diametrically opposed to the piston rod 56 and is slidably received in a bracket 60 secured to the inner ring 50 thus allowing the adjustable grill 20 to be translated parallel to the axis of cylinder 52 in both directions. Similar ears 46' are formed on the inner ring 50 and are movably received in channels 48' secured to the outer ring. The channels 48' permit rectilinear movement of the inner ring 50 relative to the outer ring 62 in directions parallel to the axis of the power unit 52 and also parallel to the axis of a second power unit 52' that is secured to the outer ring 62. Thus, full extension of the power unit 52' will cause the vibrating fingers 24 to assume the position illustrated in FIG. 2; and full extension of the piston rod 56 will move the fingers into the positions shown in FIG. 6. Similarly, full retraction of the piston rod 56 of cylinders 52 will cause the fingers to pivot to a position opposite to that illustrated in FIG. 4; and full retraction of the piston rod of cylinder 52' will pivot the fingers in the opposite direction to that illustrated in FIG. 2. It will be understood that partial extension or retraction of the cylinders 52,52' will angle the fingers at different degrees diagonally of the bed of fingers 24.

The outer ring 62 is rotatably received within a plurality of U-shaped arcuate guides 64 (FIG. 3) which are rigidly secured to the housing 12. Power means such as a hydraulic cylinder 66 is pivotally supported on a bracket 68 secured to the housing 12, and it's piston rod 70 is pivotally connected to a tab 72 on the outer ring 62. Thus, extension of the cylinder 66 will pivot the outer ring 62, the inner ring 50, and the adjustable grill 20 causing the fingers 24 to assume the twisted position as illustrated in FIG. 6. Full retraction of the piston rod of cylinder 66 will reverse the twisted angle of the pins 24, and return of the cylinder 66 to its intermediate position will assure that all fingers remain parallel in response to adjustments made by cylinders 52 and 52'.

When the fingers 24 are positioned as shown in FIG. 6, the fingers 24 near the center of the alignment grill 16 and adjustable grill 20 will extend upwardly a greater distance than the fingers near the outer periphery of the grill thereby providing a somewhat convex article supporting surface causing the article A to be moved away from the center of the grills as illustrated in FIG. 6.

Since the fingers 24 are movably supported on the vibratory base plate 32, suitable restraints may be required to prevent fingers 24 with small heads 28 from bouncing upwardly away from the vibratory plate. A suitable restraint 75 (FIGS. 2-4 and 6) is illustrated as an inverted channel having pin receiving holes therein small enough to retain the heads 28 therebelow yet large enough to allow the pins to pivot fully.

As illustrated in FIG. 1, the multi-directional vibratory conveyor 10 may be used as a conveying means for receiving a plurality of articles A (only one being shown) from a feed conveyor 74, for movement onto the vibrating conveyor 10 which may orient an article with two of its parallel side walls disposed parallel to two output conveyors 76,77 and thereafter transfer the articles to the conveyor 77 as illustrated in FIG. 1. The vibratory conveyor can also be used to perform many other functions.

In view of the above description of the first embodiment of the invention it will be apparent that direction of movement is controlled by the finger angle; and that the speed of article is controlled by the frequency, the amplitude, and the degree of finger inclination.

A second embodiment of the invention is illustrated in FIG. 7 and is substantially the same as the first embodiment. Accordingly, parts of the second embodiment that are similar to the first embodiment will be assigned the same numerals followed by the letter a.

A plurality of fingers 76 have large diameter heads 78. The heads are supported on a vibratory base plate 32a of a vibratory plate assembly 34a. The fingers 76 project through holes 18a in the alignment grill 16a, and holes 22a in the adjustment grill 20a. An article Aa is shown supported upon the fingers 76, and adjustable grill 20a is illustrated in a rotated position similar to that of FIG. 6.

When the adjustable grill 20a is in its illustrated pivoted position the large heads 78 near the outer periphery of the grills 16a, 20a are raised due to the large head 78 being angled thus raising the upper end of the outer fingers relative to the fingers near the center of the grills. Accordingly, the article Aa will become centered upon the vibratory conveyor due to the concave article supporting surface defined by the bed of fingers 76. Also, the vibrating fingers will rotate the article to a desired orientation such as positioning a side wall of an article parallel to a take-away conveyor and thereafter tilting the fingers in a desired direction to translate the articles off of the vibratory conveyor 10a.

FIG. 8 discloses a third embodiment of the invention illustrating a plurality of multi-directional vibratory conveyors 10b which cooperate to define a feed conveyor 80 which receives articles Ab that may be inspected by means (not shown), and may be diverted onto selected ones of a plurality of take-away conveyors 82a-h in accordance with detected differences between the articles by the inspecting means.

In all embodiments of the invention the fingers are made of material stiff enough to support the load to be moved, and are movably attached to the associated vibratory base plate 32,32a so that they vibrate with the associated plates.

If lightweight materials such as letters, lightweight packages, or the like are being conveyed, flexible fingers may be used. The fingers may be metallic or plastic again depending upon the weight of the article to be supported, and they may be attached to the vibrating plate by restraints 75 (FIG. 2) and 75a (FIG. 7), or swivel joints especially when very heavy articles are to be conveyed.

Conventional controls and circuitry are provided to actuate the cylinders 52,52' and 66 (FIG. 3) for translating and pivoting the adjustable grills 20. Also, conventional controls and circuitry (not shown) are provided for actuating controls that vary the amplitude and/or frequency of the vibrator 44 (FIGS. 1, 2 and 3).

All embodiments of the vibratory conveyors may be used to convey and orient articles such as heavy containers and pallets to be moved within aircraft, and into or out of an aircraft or the like. The vibratory conveyors may be used in packing houses, juice rooms, and canneries or the like for conveying small articles such as cans and/or packages; or may be used to transport boxes or pallet loads of such cans or packages. Smaller vibratory conveyors may be used to transport and orient light articles such as individual cans and/or small packages.

From the foregoing description it is apparent that the multi-directional vibratory conveyor of the present invention includes a plurality of fingers or pins which have their heads movably supported on a vibratory base plate. The fingers project through holes in an alignment grill and in an adjustable grill. The adjustment grill may be translated along paths perpendicular to each other for moving articles onto or off of the fingers. The adjustable grill may also be pivotally adjusted for causing an article supported on the supporting fingers to move in a curved path or be moved toward the center of the adjustable grill.

Although the best mode contemplated for carrying out the present invention has been shown and described, it will be apparent that modification and variation may be made without departing from what is regarded to be the subject matter of the invention.

What is claimed is:

1. A method of conveying and controlling the direction of movement of an article, comprising the steps of;
supporting the article on the top of a plurality of fingers in a bed of fingers;
maintaining the fingers parallel to each other with each finger having an upper and a lower end;
supporting the lower end of the fingers on a plate;
supporting an article to be conveyed on the upper ends of portions of several of the fingers;
vibrating the plate and fingers; and
pivoting the fingers in a plurality of different directions for conveying and controlling the direction of movement of the article in a plurality of selected directions.

2. A method according to claim 1 and additionally comprising the step of moving the vibrating fingers to a vertical position to terminate horizontal movement of the article while supported on the fingers.

3. A method according to claim 2 and additionally comprising the step of twisting the lower portions of certain ones of said fingers in the bed of fingers out of said parallelism for moving the article along a curved path.

4. A method according to claim 3 wherein the upper article supporting ends of said plurality of fingers define a convex surface for causing the article to move outwardly away from a center portion of the bed of fingers when the fingers are vibrating.

5. A method according to claim 2 wherein the article is supported on the upper ends of several fingers and when conveyed are moved onto the upper ends of other ones of the fingers.

6. A method according to claim 3 wherein the upper article supporting ends of the fingers cooperate to define a concave surface for causing the article to move inwardly toward a center portion of said bed of fingers while pivoting the article.

7. An apparatus for conveying and controlling the direction of movement of an article, comprising:
   means for supporting the article on top of a plurality of fingers defining a bed of fingers;
   means for maintaining the fingers parallel to each other with each finger having an upper end and a lower end;
   means for supporting the lower end of the fingers on a plate;
   means for vibrating the plate and fingers; and
   means for pivoting the fingers in said bed in a plurality of different directions for conveying and controlling the direction of movement of the article in a plurality of selected directions.

8. An apparatus according to claim 7 additionally comprising means for moving the vibrating fingers to a vertical position for terminating horizontal movement of the article supported on the fingers.

9. An apparatus according to claim 8 and additionally comprising means for twisting the lower portions of certain ones of said fingers in said bed out of parallelism and for moving the article along a curved path.

10. An apparatus according to claim 9 wherein the upper article supporting ends of the fingers define a curved surface for causing the article to move outwardly away from a center portion of the bed of fingers.

11. An apparatus according to claim 7 wherein the article is supported on the upper ends of several fingers and when conveyed are moved onto the upper ends of other ones of said fingers.

12. An apparatus according to claim 9 wherein the upper ends of said fingers cooperate to define a concave surface for causing the article to move inwardly toward a center portion of said bed of fingers while pivoting the article.

13. A vibratory conveyor for supporting an article to be moved in desired directions, comprising:
   means defining an alignment grill having a plurality of openings therein;
   means defining an adjustable grill having a plurality of openings therein;
   means defining a plurality of fingers with each finger projecting through associated aligned holes in said alignment grill means and in said adjustable grill means;
   means defining a vibratory member having an upper planar surface positioned below and movably supporting said fingers;
   finger orienting means for moving all of said fingers in a plurality of selected directions;
   means for vibrating said vibratory member for repeatedly vibrating said fingers through said alignment holes for moving an article supported on said pins in a predetermined direction depending upon the angle of said pins relative to said upper surface of said vibrating members.

14. An apparatus according to claim 13 wherein said finger orienting means is said adjustable grill means.

15. An apparatus according to claim 14 and additionally comprising means for selectively moving said adjustable grill means rectilinearly in four directions for positioning said pins at angles which selectively move an article supported on said pins in said four directions.

16. An apparatus according to claim 14 and additionally comprising means for selectively moving said adjustable grill means in a multiplicity of directions for positioning said pins at angles which selectively move an article supported on said pins in selected ones of said multiplicity of directions.

17. An apparatus according to claim 13 wherein said finger orienting means selectively move said adjustable grill arcuately for moving an article supported on said fingers along a curved path on said fingers which path progresses outwardly of said alignment grill.

18. An apparatus according to claim 17 wherein said plurality of fingers each have upper article supporting surfaces and wherein said upper article supporting surfaces of all fingers define a convex article supporting surface.

19. An apparatus according to claim 13 wherein each finger has an upper end and a lower end; and additionally comprising a large diameter head on the lower end of each finger which is supported on said upper planar surface of said vibratory member, and wherein said finger orienting means selectively move said adjustable grill arcuately causing an article supported thereon to move along a curved inwardly directed path which progresses outwardly of said alignment grill.

20. An apparatus according to claim 19 wherein said plurality of fingers each have upper article supporting surfaces, and wherein said upper surfaces of all fingers define a concave article supporting surface causing the article to move toward the center of said article supporting surface.

21. An apparatus according to claim 13 wherein the article supporting surface of each finger is normal to the length of each associated finger for providing a container pushing surface against an article supported thereon.

22. An apparatus according to claim 7 wherein said finger pivoting means comprises:
   first power means for moving said finger pivoting means selective amounts in selective directions along a first linear path for controlling the speed of movement of the article in said first selected direction; and
   second power means for moving said finger pivoting means selected amounts along a second linear path normal to said first linear path for controlling the speed of movement of the article along said second linear path, said first and second power means being adjustable for moving the article in any desired linear direction between said first and second linear paths.

* * * * *